Jan. 10, 1933.  W. C. JACKSON  1,893,975
SPRING FOR REENFORCING CLAMPING DEVICES
Original Filed Aug. 5, 1930
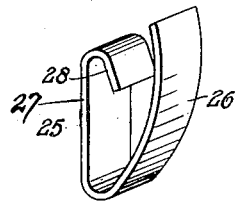
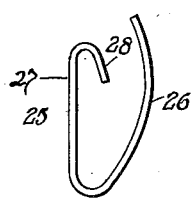
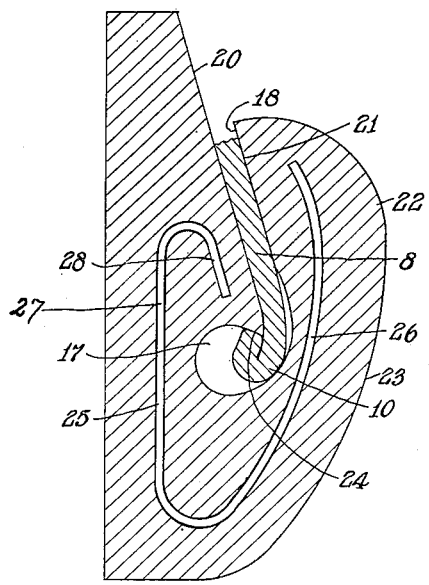
INVENTOR
WALTER C. JACKSON
BY
ATTORNEY Patented Jan. 10, 1933

1,893,975

UNITED STATES PATENT OFFICE

WALTER C. JACKSON, OF RAHWAY, NEW JERSEY, ASSIGNOR TO TINGLEY RELIANCE RUBBER CORPORATION, OF RAHWAY, NEW JERSEY, A CORPORATION OF NEW JERSEY

SPRING FOR REENFORCING CLAMPING DEVICES

Original application filed August 5, 1930, Serial No. 473,225. Divided and this application filed March 15, 1932. Serial No. 598,955.

This invention relates to a reenforcing spring for a clamp whch is adapted to be used in attaching various articles or devices to thin bodies, particularly sheet metal bodies such as for instance the wheel fenders of automobiles and is a division of my pending application for patent for splash guards, Serial No. 473,225 filed August 5, 1930.

One of the objects of my invention is to provide means for reenforcing a plastic and preferably vulcanized rubber clamp designed to act on a fish-hook principle for assuring a tight and permanent attachment to a thin body.

Another object of the invention is to provide a cushioned, reenforced, spring jaw clamp for secure attachment in position on some body in such manner that blows administered to it and the effect of pulling or tugging upon it on the devices which it carries will not loosen the hold of the jaws of the clamp nor mar the object to which it is attached.

In the accompanying drawing one practicable embodiment of my invention is illustrated, in which drawing:

Figure 1 shows, in perspective, the preferred form of my reenforcing spring.

Fig. 2 is an edge view of the spring, and

Fig. 3 is an enlarged, longitudinal section showing such spring embedded in a vulcanized rubber clamp applied to the end of an automobile fender, the clamp and fender being shown in fainter lines than the spring itself, which is the subject of this present application.

The form of my invention illustrated is designed for use in a vulcanized rubber clamp intended to be attached to a sheet metal object such, for instance, as the wheel fender of an automobile.

To the end that my present invention may be more readily understood it may be in order to first consider the clamp in which it is embedded in practice and the part to which the clamp thus reenforced is destined to be applied. The clamp shown in the illustration in faint lines is assumed to be formed of some plastic material such as vulcanized rubber and comprises what might be termed two clamping jaws. One of the clamping jaws is illustrated in the form of a face 20 carried by a thickened portion of the device and the other jaw face 21 is carried by a jaw portion 22 projecting outwardly and upwardly from the body of the device.

The opening between the jaw faces 20 and 21 comprises an enlarged bead receiving portion 17, such opening extending upwardly in a narrow slot 18 through which the bead 10 of an automobile fender 8 is forced in applying the clamp to the fender. The jaw faces 20 and 21 are normally intended to engage the sheet above the bead.

Preferably the jaw face 20 slants outwardly toward its lower end and extends upwardly and downwardly beyond the face 21 which is carried by the free end of the jaw portion 22. The face 21 is opposed to the central portion of the face 20. Below the face 21 the jaw 22 is relieved and its surface 23 is curved and merges into the walls of the bead receiving opening 17. A downwardly directed lip 24 is formed between the merger of the wall into the opening 17 and the end of the face 20 which is designed to act on a fish-hook principle assuring a tight and permanent attachment to an automobile fender, particularly when this lip 24 is drawn into the angle produced by the bead 10 where this is bent against the sheet 8.

The device which is the subject of this present application is for the purpose of reenforcing the jaw and comprises a metal body 25 which is preferably molded within the jaw. This body 25 I prefer to form of spring steel having one portion 27 ending in a bent over, hooked end, 28 and bent outwardly to present another portion 26 on the same side as is the hooked end, such latter portion being shown as having an outward curve and an inward curve ending well beyond the said hooked end. The outwardly directed member 26 adapted to extend from a point well below the cavity 17 into the free end 22. The body 27, in practice, preferably lies in about the plane of the rear surface of the device and its downwardly and rearwardly hooked end 28 is located in position to reenforce the downwardly directed lip 24.

In the illustration it will be seen that the bead 10 is normally located within the cavity 17 and that the fender part 8 is located in the slot 18 and that when in this position both the weight of the structure itself and any load incident to pulling or tugging upon it or the devices which it carries are directly borne by the hooked end 28 of the reenforcing spring and that pulling or downward pressure will not release the grip of the jaw.

Having thus described my invention, what I claim and desire to secure by Letters Patent is:

1. A reenforcing device formed from a strip of spring steel, and having one portion ending in a bent over, hooked end, and bent to present another portion on the same side as is the hooked end, such latter portion having an outward curve and an inward curve ending well beyond the said hooked end.

2. A reenforcing device formed of spring steel having one portion ending in a bent over, hooked end, and bent outwardly to present another portion on the same side as is the hooked end, such latter portion ending well beyond the said hooked end.

Signed at Rahway, New Jersey, this 8th day of March, 1932.

WALTER C. JACKSON.